United States Patent Office 3,098,869
Patented July 23, 1963

3,098,869
PREPARATION OF DIALDEHYDE POLYSACCHA-
RIDE ADDITION PRODUCTS
Peter J. Borchert, Elkhart, Ind., assignor to Miles Laboratories, Inc., Elkhart, Ind., a corporation of Indiana
No Drawing. Filed July 7, 1960, Ser. No. 41,242
11 Claims. (Cl. 260—513)

This invention relates to an improved process for preparing derivatives of dialdehyde polysaccharides and bisulfite compounds which may be designated as "polyglucosylol bisulfites" or simply dialdehyde polysaccharide bisulfites. These new derivatives are anionic polymers which result from the reaction of dialdehyde polysaccharides with bisulfite salts.

These ionic derivatives which are prepared from dialdehyde polysaccharides by means of their chemically reactive aldehyde groups greatly enlarge the scope of utility for dialdehyde polysaccharides, which are only slightly soluble in water (2–3 g. per 100 ml. of deionized water in the case of dialdehyde starch). This limited solubility precludes their use in many areas of application. The completely water-soluble ionic polymers of dialdehyde polysaccharides described in the present invention enlarge the scope of previous applications for dialdehyde polysaccharides as well as providing new uses in other fields. For example, uses such as wet strength resins for paper, textile auxiliary agents, tanning agents and others of a similar nature are now practicable. The ability of these compounds to dissolve in cold water, forming a highly viscous, clear paste, in addition makes them useful as thickening agents and opens greater possibilities for reacting dialdehyde polysaccharides with additional components.

Three types of anionic polymers of dialdehyde polysaccharides may be characterized. These are:

(I) Derivatives of dialdehyde polysaccharides and bisulfite salts in a molar ratio of 1:1 (based on the repeating polymer unit of the dialdehyde polysaccharide).
(II) Derivatives of dialdehyde polysaccharides and bisulfite salts in a molar ratio of 1:2.
(III) Derivatives of dialdehyde polysaccharides wherein one aldehyde group per dialdehyde polysaccharide polymer unit has been reacted with another compound such as urea (my copending application U.S. Serial No. 765,274, filed October 6, 1958, now Patent No. 3,001,979) and bisulfite salts.

The reaction products obtained may graphically be represented by the following structural formulae, shown for the dialdehyde starch derivatives:

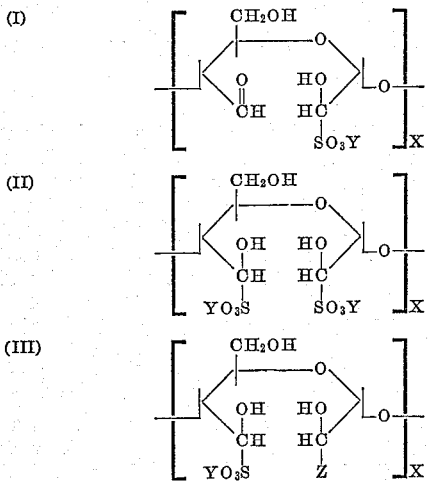

wherein X represents the number of repeating polymer units in the molecule, which in the case of dialdehyde starch may vary from as few as about 20 to as many as several thousand, Y represents the cation of the bisulfite salt and Z represents a radical such as

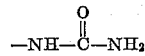

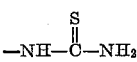

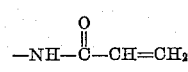

or

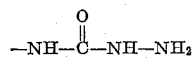

A method for the preparation of dialdehyde starch bisulfites has been disclosed in U.S. Patent No. 2,880,236 to Charles L. Mehltretter, John W. Van Cleve and Paul R. Watson. In this method, however, the reaction of the dialdehyde starch with the bisulfite in aqueous solution results in a product which is separated as a solid product only with difficulty such as by precipitating with alcohol, filtering and drying. It is evident that this procedure involves additional process steps which add to the cost of the overall process.

It is accordingly an object of this invention to provide an improved process for the preparation of dialdehyde polysaccharide bisulfites.

Another object is to provide such a process which is simple and economical to use.

A further object of this invention is to provide a process by which solid dialdehyde polysaccharide bisulfites may be readily prepared and isolated.

Yet a further object of this invention is to provide novel amino-bisulfite addition products of dialdehyde polysaccharides.

Other objects and advantages of this invention will become apparent in the course of the following detailed disclosure and description.

It has now been found that dialdehyde polysaccharide bisulfite derivatives can be readily prepared by means of a slurry reaction using a mixture of a lower aliphatic alcohol with water as the medium for reaction between the dialdehyde polysaccharide and bisulfite.

For the purpose of preparing dialdehyde polysaccharide bisulfite addition products according to the process of this invention any dialdehyde polysaccharide may be used. For example, the dialdehydes obtained from starches such as corn starches, wheat starches, tapioca starches and potato starches, celluloses, dextrins, dextrans, inulins and related materials are satisfactory for this purpose. These dialdehyde polysaccharides are generally obtained by oxidation of the appropriate polysaccharide with periodic acid. This is a well known method for the preparation of dialdehyde polysaccharides. More recently electrolytic procedures have been used such as those exemplified by U.S. Patent No. 2,648,629 to William Dvonch and Charles L. Mehltretter, and No. 2,713,553, No. 2,770,589, and 2,830,941 to Charles L. Mehltretter. It is unnecessary, of course, that any particular process be used for preparing the dialdehyde polysaccharides since any process capable of producing these compounds may be utilized for this purpose.

The bisulfite reactant may advantageously be any water soluble bisulfite salt, for example, the ammonium, sodium or potassium salt.

The process is generally carried out by slurrying the dialdehyde polysaccharide in the lower aliphatic alcohol to be used such as methanol, ethanol, isopropanol or n-propanol in mixtures with water for example. To the resulting slurry is then added a concentrated aqueous solution of the bisulfite salt. The addition of bisulfite is advantageously accomplished with stirring of the dialdehyde polysaccharide slurry. Addition may be in the molar ratio of dialdehyde polysaccharide polymer unit to bisulfite of from about 1:1 to 1:2 based on dry polysaccharide. The bisulfite may be added as an aqueous solution in a concentration of about 30% to 45% by weight such as by use of a commercially available concentrated aqueous bisulfite solution. An excess of 5% to 10% by weight of the required amount of bisulfite is recommended.

For most satisfactory results it is desirable to keep the concentration of the dialdehyde polysaccharide slurry in the range of from about 10% to 15% in order to minimize the bulk of material to be handled and filtered. The total reaction medium should contain between about 25 volume percent and 30 volume percent of water, the remainder being the alcohol as specified above. Using the above proportions the hydrogen ion concentration of the slurry is generally found to be between about pH 6.5 and pH 7.0.

Other reaction conditions are subject to choice and in no wise critical. However, it is found that the reaction proceeds more slowly at room temperature than at temperatures in the range of from about 40° C. to 55° C. so elevated temperatures are preferred. At temperatures within this range the reaction is completed within about 25 minutes to 60 minutes. Uniform reaction is promoted by stirring.

Isolation of the product as pointed out above and in contrast to the more cumbersome procedures of the prior art is accomplished with facility either by direct filtration of the voluminous precipitate which results upon cooling the reaction mixture or by precipitation with an organic solvent such as acetone. If desired the precipitate may be further purified by washing such as with a mixture of alcohol and water. In any event the thus-separated precipitate is dried preferably under vacuum and at room temperature in order to give a solid product.

The invention will be better understood by reference to the following examples which are included for purposes of illustration and are not to be construed as in any way limiting the scope of this invention, which is defined in the claims appended hereto.

EXAMPLE I

*Preparation of "Polyglucosylol Ammonium Bisulfite" Compounds Resulting From Reaction of Dialdehyde Starch With Aqueous Ammonium Bisulfite Solutions*

Molar ratio—2:1 ($NH_4HSO_3$/dialdehyde starch polymer unit).

(1) 15 g. dialdehyde starch (assay—73.3%, moisture—14.7%)=9.5 g. pure dialdehyde starch=0.059 mole.
(2) 26.4 ml. of an 44% aqueous ammonium bisulfite solution. 11.66 g. ammonium bisulfite=0.118 mole.
(3) 100 ml. methanol/water (5:1 volume).

In a 250 ml. flask equipped with stirrer, thermometer and reflux condenser were charged (1) and (3). While stirring the slurry at 40° C. on a water bath, (2) was added over a period of 5 minutes at 40° C. During that time the slurry became voluminous. After cooling it was filtered, washed with 20 ml. of a methanol/$H_2O$ mixture (5:1 per volume), then with methanol and acetone. The precipitate was dried in a vacuum stove. Yield: 29 g. (100% of the theory, calculated on an 11% moisture-containing compound). The colorless crystals are slightly soluble in cold water, with a pH of 7, and form a highly viscous, clear solution which is insoluble in alcohols and most organic solvents. Found: N, 8.72%, moisture, 10.97% (K.F.). Adding dilute acid to an aqueous, highly viscous solution of the ammonium bisulfite addition compound, sulfur dioxide is evolved and a clear solution of dialdehyde starch of low viscosity remains.

The following example illustrates the preparation of a dialdehyde polysaccharide bisulfite addition product having a molar ratio of dialdehyde polysaccharide polymer unit to bisulfite of 1:1.

EXAMPLE II (1) 30 g. dialdehyde starch (assay—73.3%, moisture—14.7%)=19.0 g. pure dialdehyde starch=0.017 mole.
(2) 23 ml. of an 44% aqueous ammonium bisulfite solution. 10.6 g. ammonium bisulfite=0.107 mole.
(3) 200 ml. methanol/water (5:1 per volume).

The preparation was exactly the same as described in Example I. Yield: 29.8 g. (100% of theory, calculated on a 10% moisture-containing compound). The colorless crystals were slightly soluble in cold water and formed a clear, viscous solution which was insoluble in alcohols and most organic solvents. When dilute acid was added to an aqueous solution of this ammonium bisulfite addition compound, sulfur dioxide was evolved and a clear solution of dialdehyde starch remained.

The following example illustrates the preparation of a dialdehyde polysaccharide bisulfite addition product having a molar ratio of dialdehyde polysaccharide polymer unit to bisulfite of 2:1 utilizing sodium bisulfite as the bisulfite reactant.

EXAMPLE III (1) 15 g. dialdehyde starch (assay—73.3%, moisture—14.7%)=9.5 g. pure dialdehyde starch=0.059 mole.
(2) 27 g. sodium bisulfite solid (58.5% $SO_2$) dissolved in 60 ml. water.
(3) 160 ml. methanol.

The same equipment as described in Example I was used. To the vigorously stirred slurry of (1) and (3), (2) was added at room temperature during a period of 5 minutes. The temperature increased to 34° C. and additional heating on a water bath at 50° C. for 25 minutes was required. After cooling, 100 ml. of acetone was added and the crystals were filtered, washed with 50 ml. of 10% water-containing acetone and dried for 30 minutes in a vacuum stove. Yield: 42 g. (100% of theory), calculated on an 11% moisture-containing product). The colorless crystals displayed the same properties and exhibited the same viscous behavior as described in Example I.

The following example illustrates the preparation of a bisulfite addition product of a dialdehyde polysaccharide-urea compound. The resulting composition is a novel compound having both urea and bisulfite groups attached to the dialdehyde polysaccharide molecule as shown in Formula III above.

EXAMPLE IV (1) 20 g. polyglucosylol urea with a content of 79% (found: N, 10.14%, moisture, 1.67%).
(2) 31.6 ml. saturated aqueous ammonium bisulfite solution.
(3) 100 ml. methanol.

The slurry containing (1), (2) and (3) was stirred and heated for 1 hour at 50–55° C. After cooling, it was washed with methanol/water (7:3) and finally with acetone. The white powder was dried for several hours at room temperature. Yield: 26 g. (98% of theory). Found: N, 10.8%. The white powder dissolved completely in water (pH 7). With dilute acids, sulfur dioxide was evolved and the polymer remained in solution.

In summary dialdehyde polysaccharide bisulfite derivatives having excellent water solubility are provided by a slurry reaction involving the use of a mixture of a lower aliphatic alcohol and water as the reaction medium for the dialdehyde polysaccharide and bisulfite salt. In addition, bisulfite addition products are prepared from dialdehyde polysaccharides in which some of the aldehyde groups have been reacted with other materials such as urea to give derivatives of dialdehyde polysaccharides having both bisulfite and urea or other groups within the same molecule.

Other embodiments than those specifically described may, of course, be used in the practice of this invention and are intended to be included within the scope thereof, which is defined in the appended claims.

What is claimed is:

1. A process for the preparation of bisulfite addition compounds of dialdehyde polysaccharides which comprises reacting a dialdehyde polysaccharide with a water soluble bisulfite salt in slurry in a reaction medium consisting of a mixture of a lower aliphatic alcohol and water and recovering the dialdehyde polysaccharide bisulfite thereby obtained.

2. A process according to claim 1 wherein the dialdehyde polysaccharide is dialdehyde starch.

3. A process according to claim 1 wherein the lower aliphatic alcohol is methanol.

4. A process according to claim 1 wherein the bisulfite salt is a salt selected from the group consisting of ammonium bisulfite, sodium bisulfite, and potassium bisulfite.

5. A process for the preparation of a bisulfite addition compound of a product selected from the group consisting of dialdehyde polysaccharides and dialdehyde polysaccharides wherein at least some of the aldehyde groups of the dialdehyde polysaccharide have been converted to groups having the structure:

wherein Z is a member selected from the group consisting of the radicals

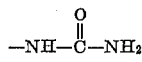

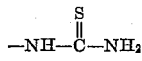

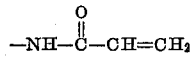

and

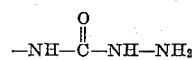

which comprises reacting said dialdehyde polysaccharide compound with a water soluble bisulfite salt in slurry in a reaction medium consisting of a mixture of a lower aliphatic alcohol and water and recovering the bisulfite addition product thereby obtained.

6. A process according to claim 5 wherein the dialdehyde polysaccharide is dialdehyde starch.

7. A process according to claim 5 where the bisulfite salt is a member selected from the group consisting of ammonium bisulfite, sodium bisulfite, and potassium bisulfite.

8. A process according to claim 5 wherein said reaction medium contains from about 25% to 30% water by volume.

9. A process for the preparation of bisulfite addition compounds of dialdehyde polysaccharides which comprises reacting a dialdehyde polysaccharide with about a 30% to 45% aqueous solution of a bisulfite salt, the mole ratio of said dialdehyde polysaccharide to bisulfite, based on the dialdehyde polysaccharide polymer unit, being about from 1:1 to 1:2, in slurry in a reaction medium consisting of a mixture of a lower aliphatic alcohol and water and recovering the dialdehyde polysaccharide bisulfite thereby obtained.

10. A process according to claim 9 wherein the bisulfite is used in an excess of about 5% to 10% by weight of the required amount.

11. A process according to claim 9 wherein the dialdehyde polysaccharide is reacted with the bisulfite at a temperature of about from 40° C. to 55° C.

References Cited in the file of this patent

UNITED STATES PATENTS

| | | |
|---|---|---|
| 2,825,727 | Caldwell | Mar. 4, 1958 |
| 2,845,417 | Kesler et al. | July 29, 1958 |
| 2,880,236 | Mehltretter | Mar. 31, 1959 |